US011460873B2

(12) United States Patent
Nam et al.

(10) Patent No.: US 11,460,873 B2
(45) Date of Patent: Oct. 4, 2022

(54) POWER MANAGEMENT INTEGRATED CIRCUIT INCLUDING DETECTION CIRCUIT WITH CAPACITIVE ELEMENT

(71) Applicant: SAMSUNG ELECTRONICS CO., LTD., Suwon-si (KR)

(72) Inventors: Hyunseok Nam, Hwaseong-si (KR); Jeongwoon Kong, Suwon-si (KR); Junhyun Bae, Hwaseong-si (KR); Sangyoung Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/338,336

(22) Filed: Jun. 3, 2021

(65) Prior Publication Data
US 2021/0382508 A1    Dec. 9, 2021

(30) Foreign Application Priority Data

Jun. 9, 2020 (KR) .................. 10-2020-0069838
Apr. 27, 2021 (KR) .................. 10-2021-0054635

(51) Int. Cl.
*G05F 1/56* (2006.01)
(52) U.S. Cl.
CPC ...................... *G05F 1/56* (2013.01)
(58) Field of Classification Search
None
See application file for complete search history.

(56) References Cited

U.S. PATENT DOCUMENTS

| | | | | |
|---|---|---|---|---|
| 5,744,944 A * | 4/1998 | Danstrom | ............... | G05F 1/565 323/274 |
| 6,127,814 A * | 10/2000 | Goder | ................. | H02M 3/1588 323/282 |
| 6,249,447 B1 * | 6/2001 | Boylan | ............. | H02M 3/33507 363/97 |
| 6,304,067 B1 | 10/2001 | Wrathall | | |
| 6,600,298 B2 * | 7/2003 | McDonald | ............ | H02M 3/156 323/285 |
| 6,683,798 B2 * | 1/2004 | Matsuura | .......... | H02M 3/33576 363/17 |
| 6,721,427 B1 | 4/2004 | Yamada | | |
| 7,245,178 B2 | 7/2007 | Kitano | | |
| 7,436,189 B2 * | 10/2008 | Pai | ........................... | G06F 1/28 323/282 |
| 7,642,762 B2 * | 1/2010 | Xie | ....................... | H02M 3/156 323/282 |
| 8,441,235 B2 | 5/2013 | Shi et al. | | |
| 8,447,275 B2 * | 5/2013 | Dearborn | ............ | H02M 3/1588 327/557 |
| 8,692,530 B2 | 4/2014 | Cleveland et al. | | |
| 8,736,244 B1 * | 5/2014 | Voigtlander | .......... | H02M 3/158 323/284 |

(Continued)

*Primary Examiner* — Thomas J. Hiltunen
(74) *Attorney, Agent, or Firm* — Volentine, Whitt & Francos, PLLC

(57) ABSTRACT

A power management integrated circuit (PMIC) includes; a DC-DC converter configured to provide output power to a load, a controller configured to control switching of the DC-DC converter, and a sense circuit including a capacitive element and configured to detect an output current flowing through a node between the DC-DC converter and the load.

16 Claims, 16 Drawing Sheets

(56) References Cited

U.S. PATENT DOCUMENTS

| | | | | |
|---|---|---|---|---|
| 8,829,877 B2* | 9/2014 | Tseng | ............... | H02M 1/12 |
| | | | | 323/284 |
| 8,866,453 B2* | 10/2014 | Lyle, Jr. | ............... | H02M 3/156 |
| | | | | 323/266 |
| 8,928,248 B2* | 1/2015 | Ishii | ............... | G05F 1/618 |
| | | | | 315/291 |
| 9,887,674 B2* | 2/2018 | Ramos | ............... | H03F 1/14 |
| 10,056,871 B2 | 8/2018 | Kwak et al. | | |
| 10,326,351 B2* | 6/2019 | Lo | ............... | H02M 3/156 |
| 10,569,695 B2* | 2/2020 | Ichikawa | ............... | H05B 47/17 |
| 2015/0188344 A1* | 7/2015 | Wang | ............... | G06F 1/266 |
| | | | | 320/107 |
| 2018/0351456 A1 | 12/2018 | Gu et al. | | |
| 2019/0086943 A1* | 3/2019 | Namekawa | ............... | G05F 1/468 |
| 2019/0207515 A1 | 7/2019 | Chiu | | |
| 2020/0028435 A1 | 1/2020 | Kim et al. | | |
| 2020/0052595 A1 | 2/2020 | Oak et al. | | |

\* cited by examiner

POWER MANAGEMENT INTEGRATED CIRCUIT INCLUDING DETECTION CIRCUIT WITH CAPACITIVE ELEMENT

CROSS-REFERENCE TO RELATED APPLICATIONS

This application claims priority under 35 U.S.C. § 119 to Korean Patent Application No. 10-2020-0069838 filed on Jun. 9, 2020 and Korean Patent Application No. 10-2021-0054635 filed on Apr. 27, 2021, the collective subject matter of which is hereby incorporated by reference.

BACKGROUND

The inventive concept relates generally to power management integrated circuits (PMICs), and more particularly, to PMICs including a detection circuit with capacitive element capable of extending the operating bandwidth of the PMICs.

PMICs have emerged as important components in a broad class of consumer products, such as smartphones, tablet Personal Computers (PCs) and the like. Such products, many of which are mobile devices or battery-operated devices, demand highly-efficient power management. That is, minimizing power consumption and increasing power efficiency are important aspects of PMICs in mobile devices. Switching regulators (e.g., pulse width modulation (PWM) direct current-to-direct current (DC-DC) converters) capable of providing power with a high driving voltage and excellent power efficiency have been widely used in PMICs, because they generally provide a stable output voltage. Unfortunately, however, DC-DC converters have a limited operating bandwidth.

SUMMARY

In response to this limitation and addressing other related issues, embodiments of the inventive concept provide PMICs including a detection circuit with a capacitive element that provides additional zero(s) and pole(s), thereby extending an operating bandwidth.

According to an aspect of the inventive concept, there is provided PMIC including; a DC-DC converter configured to provide output power to a load, a controller configured to control switching of the DC-DC converter, and a sense circuit including a capacitive element and configured to detect an output current flowing through a node between the DC-DC converter and the load.

According to an aspect of the inventive concept, there is provided a PMIC including; a DC-DC converter configured to provide output power to a load, a controller configured to control switching of the DC-DC converter, a sense circuit including a capacitive array and configured to detect an output current flowing through a node between the DC-DC converter and the load, and a frequency-digital converter configured to adjust a total capacitance of the capacitive array.

According to an aspect of the inventive concept, there is provided an operating method for a PMIC. The method includes; detecting a change in an output current at a node between the PMIC and a load, and supplying an output voltage corresponding to the output current to the node in accordance with a zero and a pole added in relation to a capacitive element included in a sense circuit.

BRIEF DESCRIPTION OF THE DRAWINGS

Beneficial aspects, as well as the making and use of the inventive concept, may be clearly understood upon consideration of the following detailed description together with the accompanying drawings in which.

DETAILED DESCRIPTION

Throughout the written description and drawings, like reference numbers and labels are uses to denote like or similar elements, components and features. Hereinafter, embodiments of the inventive concept will be described in some additional detail with reference to the accompanying drawings.

Figure 1:
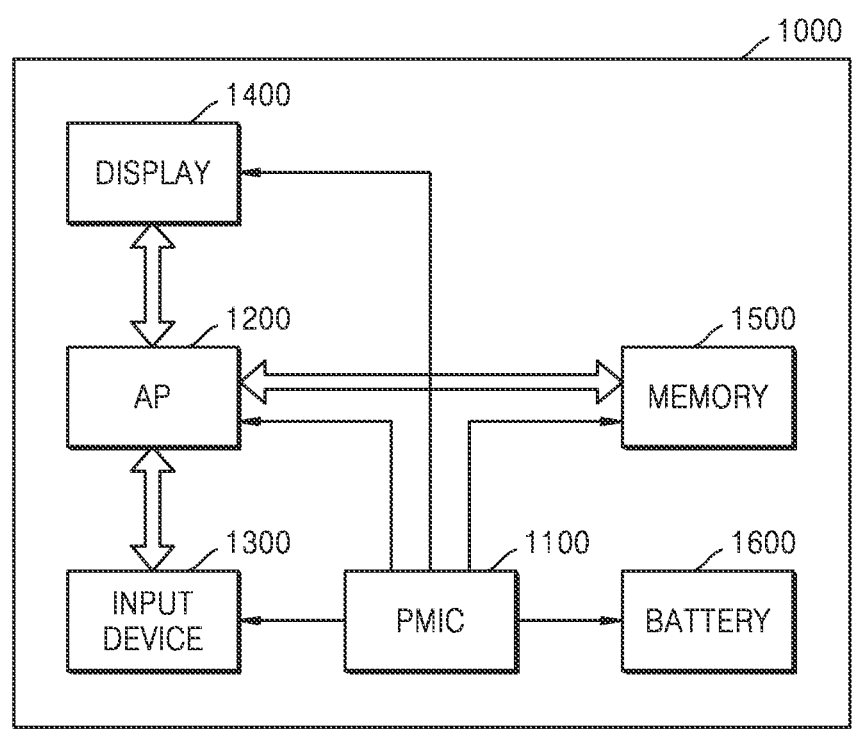
FIG. 1 is a block diagram illustrating an electronic device including a PMIC according to embodiments of the inventive concept.

Figure (FIG. 1 is a block diagram illustrating an electronic device 1000 including a power management integrated circuit (PMIC) 1100 according to embodiments of the inventive concept.

Referring to FIG. 1, the electronic device 1000 may include the PMIC 1100, an application processor (AP) 1200, an input device 1300, a display 1400, a memory 1500, and a battery 1600. In this regard, the electronic device 1000 may be any one of a device included in a vehicle, a smartphone, a personal computer (PC), a tablet PC, a netbook, an e-reader, a personal digital assistant (PDA), a portable multimedia player (PMP), an MP3 player, an ultra-mobile PC (UMPC), a workstation, a portable computer, a web tablet, a tablet computer, a wireless phone, a mobile phone, an e-book, a portable game console, a navigation device, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage constituting a data center, a device capable of communicating (e.g., transmitting and/or receiving) information via a wireless environment, various electronic devices constituting a home network, various electronic devices constituting a computer network, various electronic devices constituting a telematics network, a radio frequency identification (RFID) device, or various components constituting a computing system. In some embodiments, the electronic device 1000 may be a wearable device such as an electronic bracelet or an electronic necklace.

The electronic device 1000 may include at least one PMIC 1100. The PMIC 1100 may receive power from the battery 1600, and may generally condition, define, supply and/or manage power within the electronic device 1000 (hereafter, singularly or collectively "manage power"). That is, the PMIC 1100 may manage power in relation to the AP 1200, input device 1300, display 1400, and/or memory 1500.

Thus, in some embodiments, the electronic device 1000 may manage power in relation to the AP 1200, input device 1300, display 1400, and/or memory 1500 using a single PMIC 1100, and in other embodiments, the electronic device 1000 may manage power in relation to the AP 1200, input device 1300, display 1400, and/or memory 1500 using multiple PMICs 1100.

The AP 1200 may control overall operation of the electronic device 1000. For example, the AP 1200 may display data stored in the memory 1500 using the display 1400 according to an input signal generated by the input device 1300. Here, the input device 1300 may be implemented as a pointing device, a touch pad, a computer mouse, a keypad, a keyboard, etc.

Of particular note relative to embodiments of the inventive concept, the PMIC 1100 may operate with an extended operating bandwidth and relaxed phase margin by securing additional zeros and poles. In addition, the PMIC 1100 may operate with improved frequency response characteristics by adjusting a zero and a pole in relation to a particular operating frequency.

Figure 2:
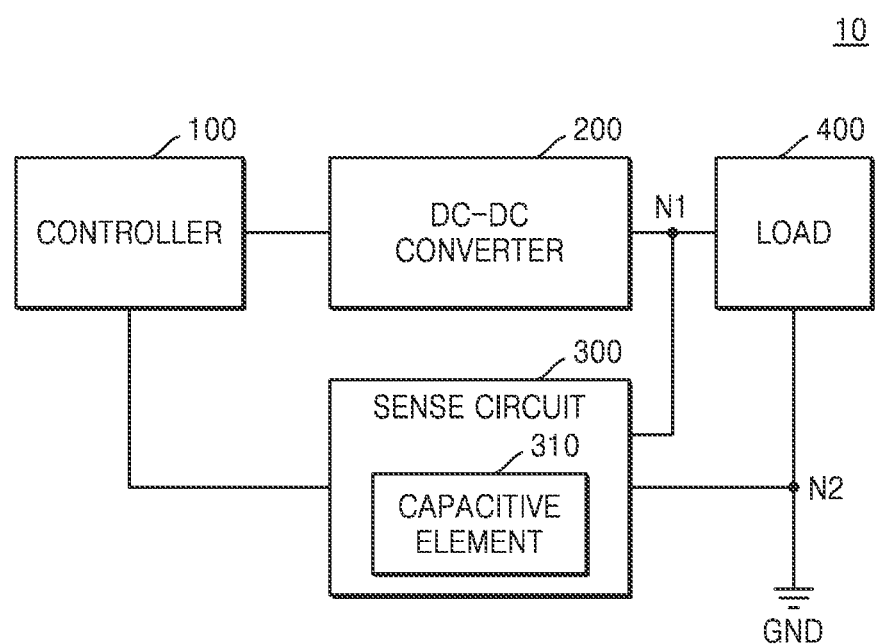
FIGS. 2, 7, 9 and 10 are block diagrams variously illustrating PMICs according to embodiments of the inventive concept.

FIG. 2 is a block diagram illustrating a PMIC 10 according to embodiments of the inventive concept. The PMIC 10 of FIG. 2 may be understood as one example of the PMIC 1100 previously described in relation to FIG. 1.

Referring to FIGS. 1 and 2, the PMIC 10 may supply power and/or a clock signal to the electronic device 1000. In this regard, the PMIC 10 may receive power from an external source, convert and/or condition (e.g., rectify) the received power to generate a stable voltage and/or current (hereafter, "voltage/current"), and then distribute and control the generated voltage/current. Here, the PMIC 10 may be implemented as a single semiconductor chip or a set of semiconductor chips.

In the illustrated example of FIG. 2, the PMIC 10 may include a controller 100, a DC-DC converter 200, a sense circuit 300, and a load 400, wherein the sense circuit 300 includes a capacitive element 310.

The controller 100 may be used to generally control operation of the PMIC 10, or at least control the intelligent components of the PMIC 10, such as the DC-DC converter 200 and the sense circuit 300. That is, the controller 100 may provide various functional control consistent with the nature and purpose of the electronic device 1000. For example, in some embodiments, the AP 1200 may be used to generate various control signal(s) controlling the intelligent components of the PMIC 10.

In some embodiments, the controller 100 may control operation of the PMIC 10 to appropriately generate output power (e.g., voltage/current) provided to the load 400 by adjusting the switching time (or switching period) of the DC-DC converter 200. That is, the controller 100 may receive control signal(s) indicating a change in output power to-be-provided to the load 400 as a result of a voltage detection operation performed by the sense circuit 300. For example, the controller 100 may adjust the switching time of the DC-DC converter 200 in response to fluctuation in the output power. Although not shown in FIG. 2, the controller 100 may provide an operating frequency for driving the PMIC 10 to other components or devices.

In some embodiments, the controller 100 may be implemented as a central processing unit (CPU), an arithmetic logic unit (ALU) performing arithmetic and logic operations (such as bit shifting), a digital signal processor (DSP), a microprocessor, and an application specific integrated circuit (ASIC), control logic, or the like. In some embodiments, the controller 100 may include a state machine including logic gates, or a combination of processor and memory storing instructions executable by the processor.

The DC-DC converter 200 may convert direct current (DC) power having a first level into DC power having a second (different) level. In some embodiments, the DC-DC converter 200 may intermit input DC power received from the external source using a switching element, and may be configured to generate output DC power by adjusting a switching period. In some embodiments, the external source providing the input DC power may be the battery 1600.

In some embodiments, the output DC power may be provided to the load 400 included in the PMIC 10.

The output DC power may be variously used as voltage/current having a level that may be changed in response to a control signal provided by the sense circuit 300. That is, in some embodiments, the first DC power and the second DC power may have different levels, different frequencies and/or different phases. However, in other embodiments, an alternating current (AC) input power may be provided by the external source, and DC power may be supplied to the DC-DC converter 200 through an appropriate AC-DC conversion (e.g., by using an AC-DC converter).

As noted above, a switching regulator may be used as one type of the DC-DC converter 200. The switching regulator may generate DC power by adjusting a switching period for a switching element. For example, the switching regulator may generate a pulse width modulation (PWM) signal using a ramp signal and generate a desired output voltage by stepping up and/or stepping down (hereafter, "stepping up/down") an input voltage in response to the PWM signal.

In some embodiments, the DC-DC converter 200 may include a buck converter that generates power having a level lower than the input power, a boost converter that generates power having a level higher than the input power, and/or a buck-boost converter that generates power having a level higher or lower than the input power. However, the inventive concept is not limited thereto, and various types of DC-DC conversion may be performed by the DC-DC converter 200.

In some embodiments, the sense circuit 300 may detect output power supplied to the load 400. That is, the sense circuit 300 may monitor output power (e.g., output voltage/current, output power, output frequency, output phase, etc.) supplied to the load 400 at a first node N1 in order to provide information to the controller 100 regarding a voltage change (e.g., a voltage drop and/or a voltage rise) associated with the output power. In some embodiments, this information may be may be communicated from the sense circuit 300 to the controller 100 in the form of a "voltage change signal."

In response to the voltage change signal, the controller 100 (or some other component in the electronic device 1000) may operate (e.g., perform one or more functions) to stabilize the output power in relation to the detected voltage change. These one or more functions may be implemented in hardware and/or software. In some embodiments, the sense circuit 300 may be further connected to ground GND at a second node N2 as a measurement reference. With this configuration, the sense circuit 300 may operate to monitor the state of the output power within an operating bandwidth having a defined range.

Under certain conditions, the magnitude of the output power (e.g., output current) provided by a DC-DC converter, as well as variation(s) in the output power may increase. A sudden change in output current may cause an output voltage to drop below a minimal threshold value. Should the output voltage fall below the minimal threshold value, it may not be provided to a load and malfunction of an electronic device incorporating the DC-DC converter may occur. Here, as conventionally provided, the operating bandwidth of the DC-DC converter 200 may be limited by its structural (or constituent) characteristics. Further, the DC-DC converter 200 may experience switching loss, and thus, there are real limits to expanding the operating bandwidth of PMICs incorporating the DC-DC convert 200.

However, according to embodiments of the inventive concept, the sense circuit 300 may include the capacitive element 310. In this regard, the "capacitive element" may be understood as an element in which the phase of a current leads the phase of a voltage in an AC circuit. The capacitive element 310 may be variously configured. For example, the capacitive element 310 may include one or more discrete capacitor(s). In this context the term "discrete" denotes a physically identifiable element, as contrasted with distributed, parasitical or inherent elements.

In some embodiments, the capacitive element 310 may be a variable capacitor. In some embodiment, the capacitive element 310 may be a capacitor array including two or more capacitors. However, the inventive concept is not limited thereto, and the capacitive element 310 may be implemented as a combination of passive and/or active elements capable of influencing (or changing) capacitance. Thus, in some embodiments, the capacitive element 310 may denote one or more passive and/or active element(s) providing a capacitive reactance greater than an inductive reactance.

As described above, in some embodiments, the disposition and connection of the sense circuit 300 within the PMIC 10 may be understood as implementing a negative feedback path in relation to the controller 100. Thus, in some embodiments, the capacitive element 310 may be understood as an additional capacitive element added to the negative feedback path of the sense circuit 300. In this regard, by adding the capacitive element 310 to negative feedback path of the sense circuit 300, embodiments of the inventive concept generate additional zero(s) and pole(s) in relation to the operation of the sense circuit 300. These added zero(s) and pole(s) may effectively increase the operating bandwidth (as well as the phase margin) of the DC-DC converter 200 and the PMIC 10.

Thus, the added capacitive element 310 may be used to adjust a total capacitance of the negative feedback path. Here, the total capacitance may be determined in accordance with an allowable operating frequency or an allowable operating bandwidth of the PMIC 10. And the total capacitance including the capacitive element 310 may be adjusted, such that an optimal pole and zero arrangement may be provided under the control of the electronic device 1000.

In the foregoing description, the load 400 may be understood as any element or component consuming electrical energy that is managed by the PMIC 10. In this regard, the load 400 may be a modeling of total resistance required for the operation of the electronic device 1000. Hence, the load 400 is provided with voltage/current managed by the PMIC 10.

In some of the illustrated embodiments of the inventive concept, the load 400 is described as being included within the PMIC 10, but this is merely an example for convenience of description. The load 400 may be understood as a modeling of electrical energy sinks associated with various intellectual properties that variably require voltage/current during operation of the electronic device 1000.

Of particular note, embodiments of the inventive concept (e.g., PMIC 10) fully address the operating bandwidth limitations associated with the DC-DC converter 200 by providing the sense circuit 300 with the capacitive element 310. Accordingly, embodiments of the inventive concept may extend an operating bandwidth and a phase margin to better stabilize the electronic device 100 incorporating the PMIC 10. As additional benefits, because embodiments of the inventive concept may adjust a zero and pole arrangement by adjusting the capacitance of the capacitive element 310, transient response states may be quickly stabilized and frequency response characteristics may be improved.

Figure 3A:
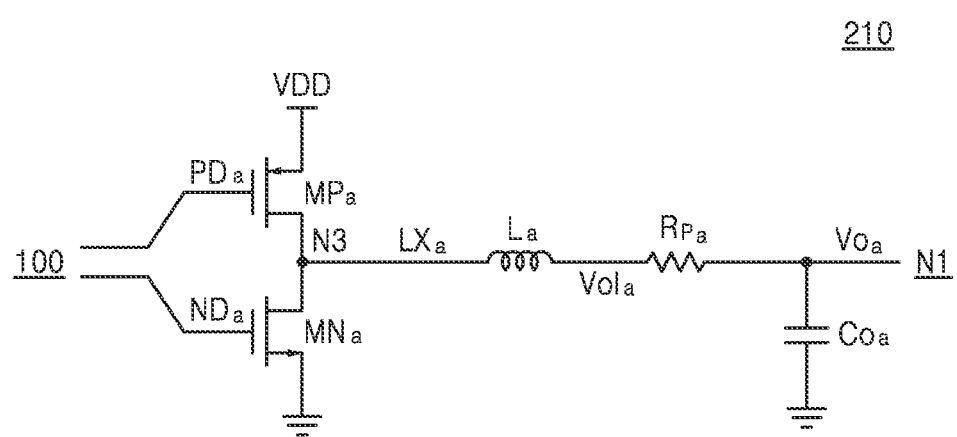
FIGS. 3A, 3B, and 3C are respective circuit diagrams illustrating a DC-DC converter according to embodiments of the inventive concept.

FIG. 3A is a circuit diagram illustrating a DC-DC converter 210 according to an embodiment of the inventive concept. The DC-DC converter 210 of FIG. 3A is one example of the DC-DC converter 200 of FIG. 2 and may be used to perform the functions described above.

Referring to FIGS. 2 and 3A, the DC-DC converter 210 may be implemented as a buck converter capable of generating output power having a level lower than the input power. For example, the DC-DC converter 210 may include a P-type metal oxide semiconductor field effect transistor (MOSFET) MPa, an N-type MOSFET MNa, an inductor La, a converter resistor Rpa, and a converter capacitor Coa.

The DC-DC converter 210 may be provided with a P-type MOSFET control signal PDa and/or an N-type MOSFET control signal NDa from the controller 100, and may convert a source voltage VDD into a DC voltage having a different level. In some embodiments, the DC-DC converter 210 may generate a DC voltage having a level smaller than the source voltage VDD. The DC-DC converter 210 may generate an output voltage Voa as an output, wherein the output voltage may be provided to the first node N1.

In some embodiments, the source voltage VDD may be applied from one end (e.g., a source) of the P-type MOSFET MPa, a third node N3 may be formed at the other end (e.g., a drain) of the P-type MOSFET MPa, and the P-type MOSFET control signal PDa may be provided to a gate of the P-type MOSFET MPa. In some embodiments, the third node N3 may be formed at one end (e.g., a drain) of the N-type MOSFET MNa, the ground power GND may be applied from the other end (e.g., a source) of the N-type MOSFET MNa, and the N-type MOSFET control signal NDa may be provided to a gate of the N-type MOSFET MNa. In some embodiments, the DC-DC converter 210 may convert the source voltage VDD into a voltage having a different level by controlling the P-type MOSFET MPa and the N-type MOSFET MNa based on the P-type MOSFET control signal PDa and the N-type MOSFET control signal NDa.

The P-type MOSFET MPa and the N-type MOSFET MNa may share the third node N3. For example, the drain terminal of the P-type MOSFET MPa and the drain terminal of the N-type MOSFET MNa may be connected to each other by sharing the third node N3 as a contact. Here, the third node N3 may also be connected to a first line LXa.

In some embodiments, a voltage converted by the P-type MOSFET MPa and the N-type MOSFET MNa may be provided through the first line LXa. The converted voltage provided through the first line LXa may drop to an intermediate voltage Vo1a upon passing through the inductor La. A potential between the inductor La connected to the line LXa and the converter resistor Rpa may be Vo1a. The output voltage Voa may be generated upon the intermediate voltage Vo1a passing through the converter resistor Rpa. The converter capacitor Coa may charge (or store) electrical charge corresponding to the output voltage Voa or discharge electrical charge corresponding to the output voltage Voa.

The controller 100 may output the P-type MOSFET control signal PDa such that the P-type MOSFET MPa is turned ON for a time period longer than that of the N-type MOSFET MNa in response to the voltage change signal provided by the sense circuit 300. Accordingly, the reduced converter capacitor Coa may be recharged, and the output voltage Voa may rise again by a required level. Similarly, when a required current of the system is momentarily reduced, the N-type MOSFET MNa may be turned ON for a period of time longer than that of the P-type MOSFET MPa.

Figure 3B:
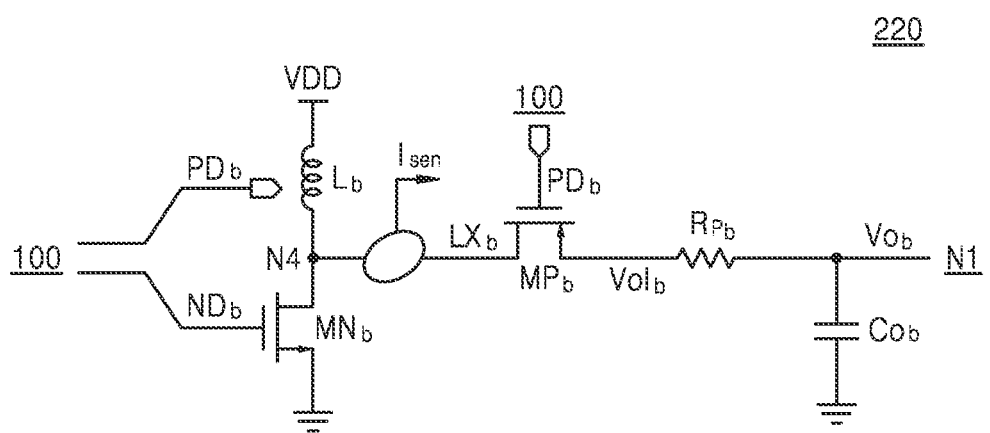

FIG. 3B is a circuit diagram illustrating a DC-DC converter 220 according to an embodiment of the inventive concept. Here again, the DC-DC converter 220 illustrated in FIG. 3B may perform the functions previously described in relation to the DC-DC converter 200 of FIG. 2. However, in contrast to the DC-DC converter 210 of FIG. 3A, the DC-DC converter 220 of FIG. 3B may be implemented as a boost converter type DC-DC converter capable of generating an output voltage Vob having a level higher than input power.

Referring to FIGS. 2 and 3B, the DC-DC converter 220 may include an inductor Lb, an N-type MOSFET MNb, a P-type MOSFET MPb, a converter resistor Rpb, and a converter capacitor Cob.

The DC-DC converter 220 may be provided with a P-type MOSFET control signal PDb and/or an N-type MOSFET control signal NDb by the controller 100, and may convert the source voltage VDD to a DC voltage having a different level. In some embodiments, the DC-DC converter 220 may generate a DC voltage having a level higher than the source voltage VDD. The DC-DC converter 220 may generate an output voltage Vob as an output. The output voltage Vob may be provided to the first node N1.

In some embodiments, the source voltage VDD may be applied from one end of the inductor Lb, and a fourth node N4 may be formed at the other end of the inductor Lb. In some embodiments, the fourth node N4 may be formed at one end (e.g., drain) of the N-type MOSFET MNb, the ground power GND may be applied from the other end (e.g., a source) of the N-type MOSFET MNb, and an N-type MOSFET control signal NDb may be provided to a gate of the N-type MOSFET MNb. In some embodiments, the DC-DC converter 220 may convert the source voltage VDD into a voltage having a different level by controlling the N-type MOSFET MNb based on the N-type MOSFET control signal NDb.

The inductor Lb and the N-type MOSFET MNb may share the fourth node N4. For example, one end of the inductor Lb and the drain terminal of the N-type MOSFET MNb may be connected to each other by sharing the fourth node N4 as a contact. Here, the fourth node N4 may also be connected to a first line LXb.

In some embodiments, a voltage converted by the inductor Lb and the N-type MOSFET MNb may be provided through the first line LXb. A current supplied through the first line LXb may be used as a "detection current" Isen. The first line LXb may be connected to the P-type MOSFET MPb. A voltage potential at the fourth node N4 may drop to an intermediate voltage Vo1b upon passing through the P-type MOSFET MPb. A voltage between the inductor Lb connected to the line LXb and the converter resistor Rpb may be Vo1b. The output voltage Vob may be generated upon the intermediate voltage Vo1b passing through the converter resistor Rpb. Here, the converter capacitor Cob may charge (or store) electrical charge corresponding to the output voltage Vob or discharge electrical charge corresponding to the output voltage Vob.

One end (e.g., a drain) of the P-type MOSFET MPb may be connected to the fourth node N4, and the other end (e.g., a source) of the P-type MOSFET MPb may be connected to the converter resistor Rpb. In addition, a P-type MOSFET control signal PDb may be provided to a gate of the P-type MOSFET MPb. The P-type MOSFET control signal PDb may be provided from the controller 100.

Figure 3C:
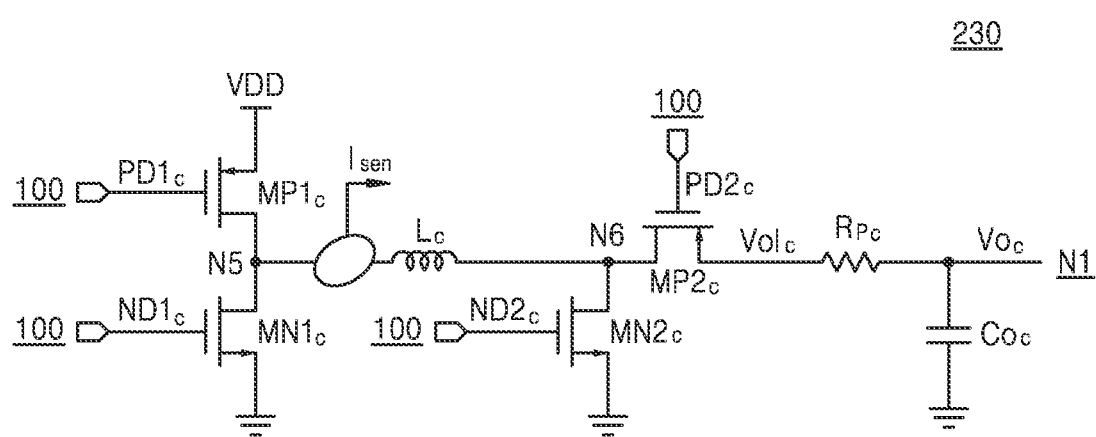

FIG. 3C is a circuit diagram illustrating a DC-DC converter 230 according to an embodiment of the inventive concept.

Here again, the DC-DC converter 230 of FIG. 3C may perform the functions previously described in relation to the DC-DC converter 200 of FIG. 2. However, in contrast to the buck converter type DC-DC converter 210 of FIG. 3A and the boost converter type DC-DC converter 220 of FIG. 3B, the DC-DC-converter 230 of FIG. 3C may be implemented as a buck-boost converter type DC-DC converter capable of increasing or reducing the level of the output voltage relative to an input voltage.

The DC-DC converter 230 may include a first P-type MOSFET MP1c, a first N-type MOSFET MN1c, an inductor Lc, a second P-type MOSFET MP2c, a second N-type MOSFET MN2c, a converter resistor Rpc, and a converter capacitor Coc.

The DC-DC converter 230 may be provided with a first P-type MOSFET control signal PD1c and/or a first N-type MOSFET control signal ND1c from the controller 100, and may convert the source voltage VDD into a DC voltage having a different level. In some embodiments, the DC-DC converter 230 may generate a DC voltage having a level greater or less than the source voltage VDD. The DC-DC converter 230 may generate an output voltage Voc as an output. The output voltage Voc may be provided at the first node N1.

In some embodiments, the source voltage VDD may be applied from one end (e.g., a source) of the first P-type MOSFET MP1c, a fifth node N5 may be formed at the other end (e.g., a drain) of the first P-type MOSFET MP1c, and a first P-type MOSFET control signal PD1c may be provided to a gate of the first P-type MOSFET MP1c. In some embodiments, the fifth node N5 may be formed at one end (e.g., a drain) of the first N-type MOSFET MN1c, the ground power GND may be applied from the other end (e.g., a source) of the first N-type MOSFET MN1c, and a first N-type MOSFET control signal ND1c may be provided to a gate of the first N-type MOSFET MN1c. In some embodiments, the DC-DC converter 230 may convert the source voltage VDD into a voltage having a different level by controlling the first P-type MOSFET MP1c and the first N-type MOSFET MN1c based on the first P-type MOSFET control signal PD1c and the first N-type MOSFET control signal ND1c. The fifth node N5 may also be connected to the inductor Lc. A current flowing through the inductor Lc may be referred to as a detection current Isen. The first P-type MOSFET MP1c and the first N-type MOSFET MN1c may share the fifth node N5. For example, the drain terminal of the first P-type MOSFET MP1c and the drain terminal of the first N-type MOSFET MN1c may be connected to each other by sharing the fifth node N5 as a contact.

In some embodiments, a voltage converted by the first P-type MOSFET MP1c and the first N-type MOSFET MN1c may reach a sixth node N6 by passing through the inductor Lc. The sixth node may be connected to the second N-type MOSFET MN2c and the second P-type MOSFET MP2c. For example, a drain terminal of the second P-type MOSFET MP2c and a drain terminal of the second N-type MOSFET MN2c may be connected to each other by sharing the sixth node N6 as a contact. A source terminal of the second N-type MOSFET MN2c may be connected to the ground power GND, a second N-type MOSFET control signal ND2c may be provided to a gate terminal of the second N-type MOSFET MN2c, and a source terminal of the second P-type MOSFET MP2c may be connected to the converter resistor Rpc. A voltage represented at the sixth node N6 may be changed into an intermediate voltage Vo1c as a result of passing through the second P-type MOSFET MP2c, and an output voltage Voc may be generated as a result of the intermediate voltage Vo1c passing through the converter resistor Rpc. The converter capacitor Coc may charge electrical charge corresponding to the output voltage Voc or discharge electrical charge corresponding to the output voltage Voc.

Figure 4:
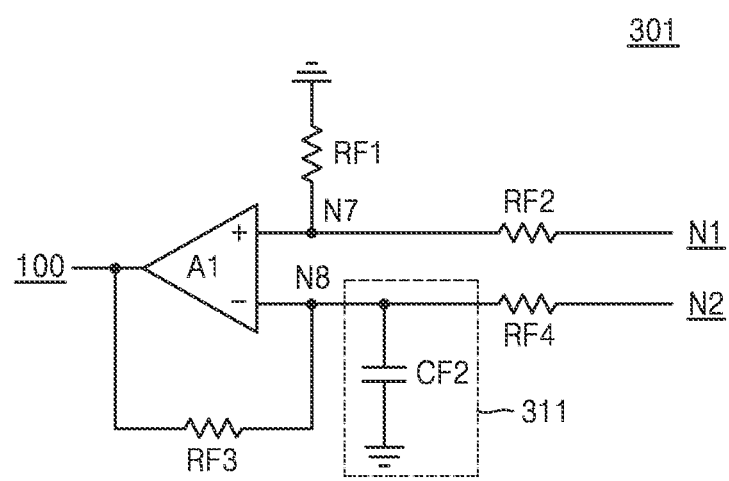
FIG. 4 is a circuit diagram illustrating a detection circuit according to embodiments of the inventive concept.

FIG. 4 is a circuit diagram illustrating a sense circuit 301 according in embodiments of the inventive concept. Here, the sense circuit 301 of FIG. 4 is one example of the sense circuit 300 of FIG. 2 and may perform the functions previously described.

Referring to FIG. 4, the sense circuit 301 may include an amplifier A1, resistive elements (e.g., first to fourth resistors) RF1, RF2, RF3, and RF4, and a capacitive element 311.

The amplifier A1 may be implemented as an operational amplifier, but is not limited thereto. The first resistor RF1 may be connected to a seventh node N7 between a positive input terminal of the amplifier A1 and the ground power GND, and the second resistor RF2 may be connected to each of the seventh node N7 and the first node N1. The third resistor RF3 may be connected to an eighth node N8, which is between a negative input terminal of the amplifier A1 and an output terminal of the amplifier, and the fourth resistor RF4 may be connected between the eighth node N8 and the second node N2.

In some embodiments, a ratio of resistance values of the first resistor RF1 and the second resistor RF2 may be the same as a ratio of resistance values of the third resistor RF3 and the fourth resistor RF4. However, the inventive concept is not limited thereto, and the resistance values of the resistive elements RF1, RF2, RF3, and RF4 may be changed according to a transfer function or electrical characteristics required for the PMIC 10. For example, the resistance value of the third resistor RF3 may be the same as the resistance value of the first resistor RF1, and the resistance value of the fourth resistor RF4 may be the same as the resistance value of the second resistor RF2.

In some embodiments, the capacitive element 311 may be connected between the eighth node N8, which is the negative input terminal of the amplifier, and the ground power GND. The ground power GND to which the capacitive element 311 is connected may be different from or the same as ground power GND to which the first resistor RF1 is connected.

Consistent with the description of the capacitive element 310 above, the capacitive element 311 may include at least one capacitor. The capacitive element 311 may be understood as an element in which a phase of a current leads a phase of a voltage in an AC circuit. In some embodiments, the capacitive element 311 may be a variable capacitor or may include a capacitor array including two or more capacitors. However, the inventive concept is not limited thereto, and the capacitive element 311 may be implemented as any reasonable combination of passive and/or active elements capable of changing capacitance. However in FIG. 4, the capacitive element 311 is described as a single capacitor CF2 for convenience of description.

In some embodiments, one end of the capacitor CF2 may be connected to the eighth node N8 to which the third resistor RF3, connected to the negative input terminal of the amplifier, is connected. In addition, the other end of the capacitor CF2 may be connected to the ground power GND.

The addition of the capacitive element 311 creates additional zeros and poles in the sense circuit 300. When the resistance value of the first resistor RF1 is the same as the resistance value of the third resistor RF3, a zero additionally may be generated by the capacitive element 311 as described by Equation 1 immediately below.

$$\omega_z = \frac{1}{RF1 \cdot CF2}$$

When the resistance value of the first resistor RF1 is the same as the resistance value of the third resistor RF3, a pole additionally may be generated by the capacitive element 311 as described by Equation 2 immediately below.

$$\omega_{P1,2} = \frac{-(1 + RF1 \cdot CF2 \cdot \omega_{3\,dB}) \pm j\sqrt{4 \cdot RF1 \cdot CF2 \cdot (2 + A) \cdot \omega_{3\,dB}}}{RF1 \cdot CF2}$$

Here, A denotes an open loop gain of the amplifier A1, and $\omega_{3\,dB}$ may denote a 3 dB pole of the amplifier A1.

The zero and pole generated by the additional of the capacitive element 311 may be adjusted by total capacitance of the first resistor RF1, the second resistor RF2, and the capacitive element 311 (e.g., the capacitor CF2).

Referring to FIGS. 3A, 3B and 3C, when the current drawn by the load 400 increases momentarily, the converter capacitor Coa, Cob, or Coc connected to the first node N1 to which the output voltage Voa, Vob, or Voc is supplied may momentarily provide a required current and the voltage of the converter capacitor Coa, Cob, or Coc may decrease as much as corresponding to a discharged current. The reduced output voltage Voa, Vob, or Voc may be detected by the sense circuit 300.

Thus, when the use environment of a PMIC changes (e.g., an additional current draw), the magnitude and variation of output power provided by a DC-DC converter will increase. Under certain conditions, such change in the output power may become significant, the function of providing output power to a load 400 or electronic device may malfunction. Therefore, PMICs have been designed to suppress significant change in the output power.

One conventional approach to the suppression of significant change in the output power, increases the size of the converter capacitor Co, but this requires a great deal of physical space and increases fabrication cost for the PMIC. Further, where a DC-DC converter using a switching element is incorporated in the design of the PMIC, operating bandwidth may be limited.

In contrast, PMICs according to embodiments of the inventive concept extend operating bandwidth and phase margin, while stabilizing the output voltage by securing additional poles and zeros through the addition of the capacitive element. As a result, because the zeros and poles may be adjusted by detecting an operating frequency of a PMIC according to embodiments of the inventive concept, frequency response characteristics may be improved. In addition, the PMICs according to embodiments of the inventive concept may secure fast frequency response characteristics by selecting an adjustment mode for the capacitive element in accordance with a change in the operating frequency.

Figure 5A:
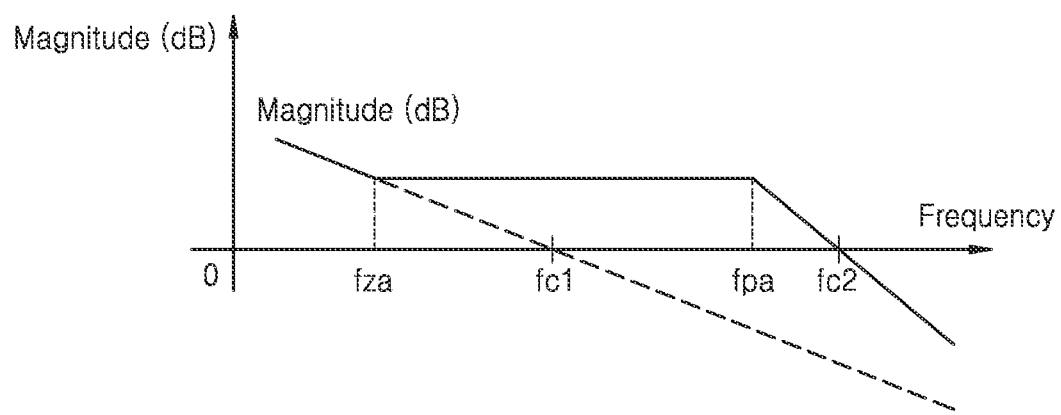
FIGS. 5A and 5B are related graphs illustrating a relationship between magnitude and frequency, as well as a relationship between magnitude and phase over frequency for PMICs according to embodiments of the inventive concept.
Figure 5B:
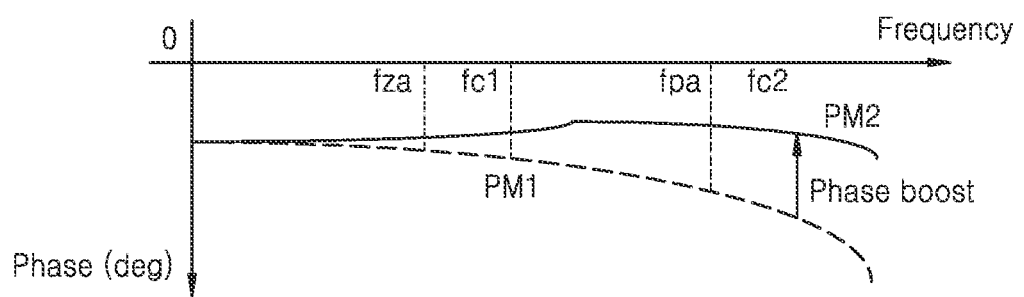

FIGS. 5A and 5B are graphs illustrating a relationship between magnitude and phase over frequency for PMICs according to some embodiments of the inventive concept.

FIGS. 5A and 5B are shown as a Bode Plot. In FIG. 5A, the horizontal axis may indicate a frequency and the vertical axis may indicate a magnitude of a signal in a decibel (dB) scale. In FIG. 5B, the horizontal axis may indicate a frequency and the vertical axis may indicate a phase of the signal in a degree scale.

Referring to FIGS. 2, 4 and 5A, the magnitude of a conventional response is indicated by a dashed line, and the magnitude of a response provided by embodiments of the inventive concept is indicated by a solid line. Referring to the dashed line in FIG. 5A, an operating bandwidth of a conventional DC-DC converter is a first frequency fc1.

However, in some embodiments, when a zero and a pole are added in relation to the addition of the capacitive element 310 (311), the operating bandwidth may be increased. Thus, in some embodiments, referring to the solid line in FIG. 5A, due to the added pole and zero in relation to the capacitive element 310 (311), a second frequency fc2, higher than the first frequency fc1 may be obtained as an improved operating frequency.

As a break frequency at which a fluctuation tendency of the magnitude changes, a zero break frequency fza is described in Equation 3 immediately below.

$$fza = {}^\omega Z/(2\pi)$$

As a break frequency at which the fluctuation tendency of the magnitude changes, a pole break frequency fpa is described by Equation 4 immediately below.

$$fpa = {}^\omega P/(2\pi)$$

Referring to the solid line in FIG. 5A, because the PMIC according to embodiment of the inventive concept includes the additional zero and pole, the magnitude gradually descending with a certain slope (e.g., −20 dB/decade) may be maintained to be parallel to the frequency axis at the zero break frequency fza corresponding to the additional zero. In addition, the magnitude maintained at the certain size may gradually decrease again from the pole break frequency fpa corresponding to the additional pole. According to Equation 2, because it may be understood that the pole break frequency fpa has two poles wp1 and wp2, a falling slope of the magnitude may be twice (e.g., −40 dB/dec) the slope (e.g., −20 dB/dec) before the zero break frequency fza (e.g., −20 dB/dec).

Referring to FIGS. 2, 4 and 5B, the phase according to a conventional response is shown as the dashed line, and the phase according to embodiments of the inventive concept is shown as the solid line. Referring to the dashed line in FIG. 5B, a phase margin for the conventional DC-DC converter may be as much as a first phase PM1. As the operating bandwidth is increased, the phase margin may be reduced.

However, in some embodiments, when a zero and a pole are added in relation to the capacitive element 310 (311), the phase margin may increase. Referring to the solid line of FIG. 5B, the phase may increase, as compared to the conventional response (dashed line) even at a frequency greater than the zero break frequency fza due to the influence of the additional pole and zero, and may decrease from an interval between the first frequency fc1 and the pole break frequency fpa. Therefore, because a second phase PM2 at the second frequency fc2 may not be significantly higher than the first phase PM1, phase margin may be extended (i.e., a phase boost may be obtained).

With improved operating frequency and phase margin secured, PMIC according to embodiments of the inventive concept may also secure fast response characteristics and improved, overall system stability.

Figure 6:
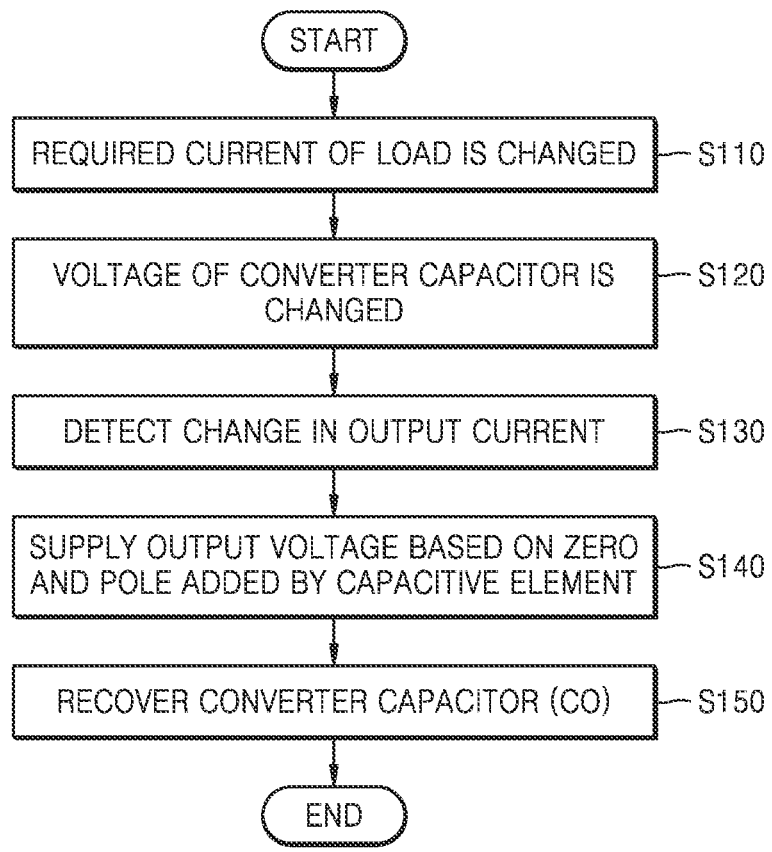
FIG. 6 is a flowchart illustrating a method of operating a PMIC according to embodiments of the inventive concept.

FIG. 6 is a flowchart illustrating in one example a method of operating a PMIC according to embodiments of the inventive concept.

Referring to FIGS. 2, 3A and 6, in the exemplary method, a load current for the load 400 is changed (S110). In this regard, the load current may be a current required to properly operate the electronic device 1000. Assuming that the PMIC 10 is connected to the load 400 at the first node N1, voltage/current required for the proper operation of the load 400 may vary as a result of processing rate, environment and demanded performance level.

As a result of the change in load current, a voltage of the converter capacitor Coa included in the DC-DC converter 210 is changed (S120). In some embodiments, as the required current of the load 400 varies, the converter capacitor Coa may provide current required for the load 400.

According, a change in the output current may be detected by the sense circuit 300 (S130). In some embodiments, a current transferred through the first node N1 may be varied by the converter capacitor Coa according to the change in the required current of the load 400.

Then, the output voltage Vco1 may be supplied in accordance with a zero and a pole added in relation to the capacitive element 310 (S140). In some embodiments, the sense circuit 300 may include the added zero and pole by including the capacitive element 310, and accordingly, an operating bandwidth of the PMIC 10 may be extended. The sense circuit 300 may provide a detection result to the controller 100. The controller 100 may control the DC-DC converter 200 to supply an output voltage Voa having fast transient response stability based on the extended operating bandwidth. The DC-DC converter 200 may provide the output voltage Voa at the first node N1.

Then, the voltage of the converter capacitor Coa may be recovered (S150). For example, as the converter capacitor Coa supplies current to the load, the converter capacitor Coa may be charged, and as the converter capacitor Coa stores electrical charge, the converter capacitor Coa may be discharged.

Figure 7:
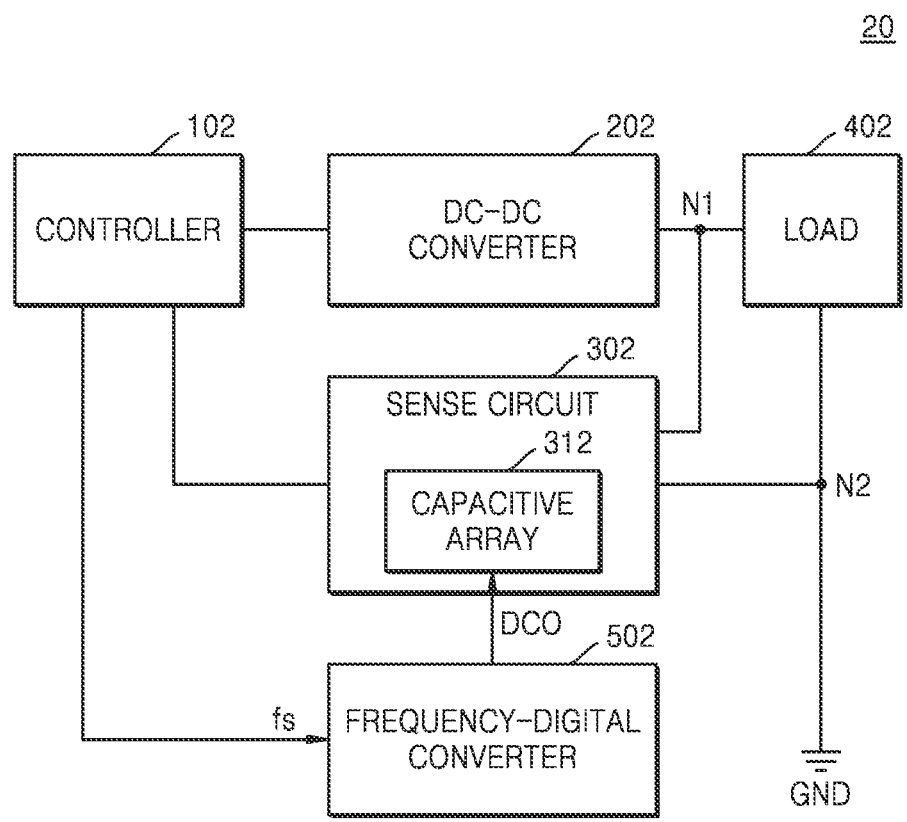

FIG. 7 is a block diagram illustrating a PMIC 20 according to embodiments of the inventive concept. Here, the PMIC 20 of FIG. 7 may be understood as a modification of the PMIC 10 of FIG. 2.

Referring to FIG. 7 (and in comparison with the embodiment of FIG. 2), the PMIC 20 includes a controller 102, a DC-DC converter 202, a sense circuit 302, a capacitive array 312 included in the sense circuit 302, a load 402, and a frequency-digital converter (FDC) 502.

An operating frequency fs may be varied to reduce an influence such as electromagnetic interference (EMI) on the PMIC 20. Frequency response characteristics may be improved by adjusting total capacitance of the capacitive array 312 based on the operating frequency fs of the PMIC 20.

Accordingly, the FDC 502 may be used to convert the operating frequency fs provided from the controller 102 to a digital code output (DCO), and the capacitive array 312 may adjust the total capacitance by adjusting switching in response to the DCO.

A zero and a pole may be dependent on the operating frequency. In some embodiments, when the operating frequency increases, the zero and the pole may move to a relatively high frequency band. In response to an increase in operating frequency, the FDC 502 may reduce the total capacitance of the capacitive array 312. For example, the FDC may provide the DCO as a digital signal for adjusting a combination of a plurality of capacitors to lower capacitance of the variable capacitor or reduce the total capacitance of the capacitive array 312. In some embodiments, when the operating frequency fs decreases, the zero and the pole may move to a low frequency band, and the FDC may generate the DCO as a digital signal adjusting a combination of a plurality of capacitors to increase the capacitance of the variable capacitor or increase the total capacitance of the capacitive array 312.

Figure 8:
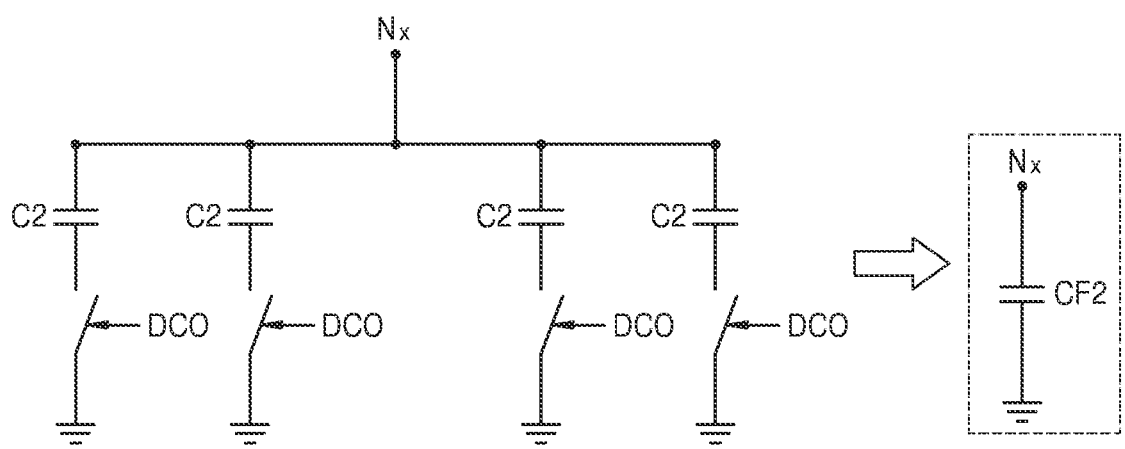
FIG. 8 is a circuit diagram illustrating a capacitive array according to embodiments of the inventive concept.

FIG. 8 is a circuit diagram illustrating a capacitive array 314 that may be used in some embodiments of the inventive concept.

Referring to FIG. 8, the capacitive array 314 may include a plurality of capacitors C2 connected in parallel. One end of each of the plurality of capacitors C2 may be connected to a node x (Nx), and the other end of each of the plurality of capacitors C2 may be connected to a switch in series, and intermittence of the switch being controlled by the DCO.

In some embodiments, the capacitive array 314 may have total capacitance adjusted based on the DCO. For example, depending on the DCO, some of the plurality of capacitors C2 may be closed, and the other of the plurality of capacitors C2 may be opened.

As a result of appropriately synthesizing the plurality of capacitors C2, a desired equivalent capacitance CF2 may be generated. That is, the capacitor CF2 having a capacitance value corresponding to a combined capacitance value of the plurality of capacitors C2 may be generated. In some embodiments, the capacitive array 314 may be referred to as a plurality of capacitors C2, or as a collective whole, as capacitor CF2.

Figure 9:
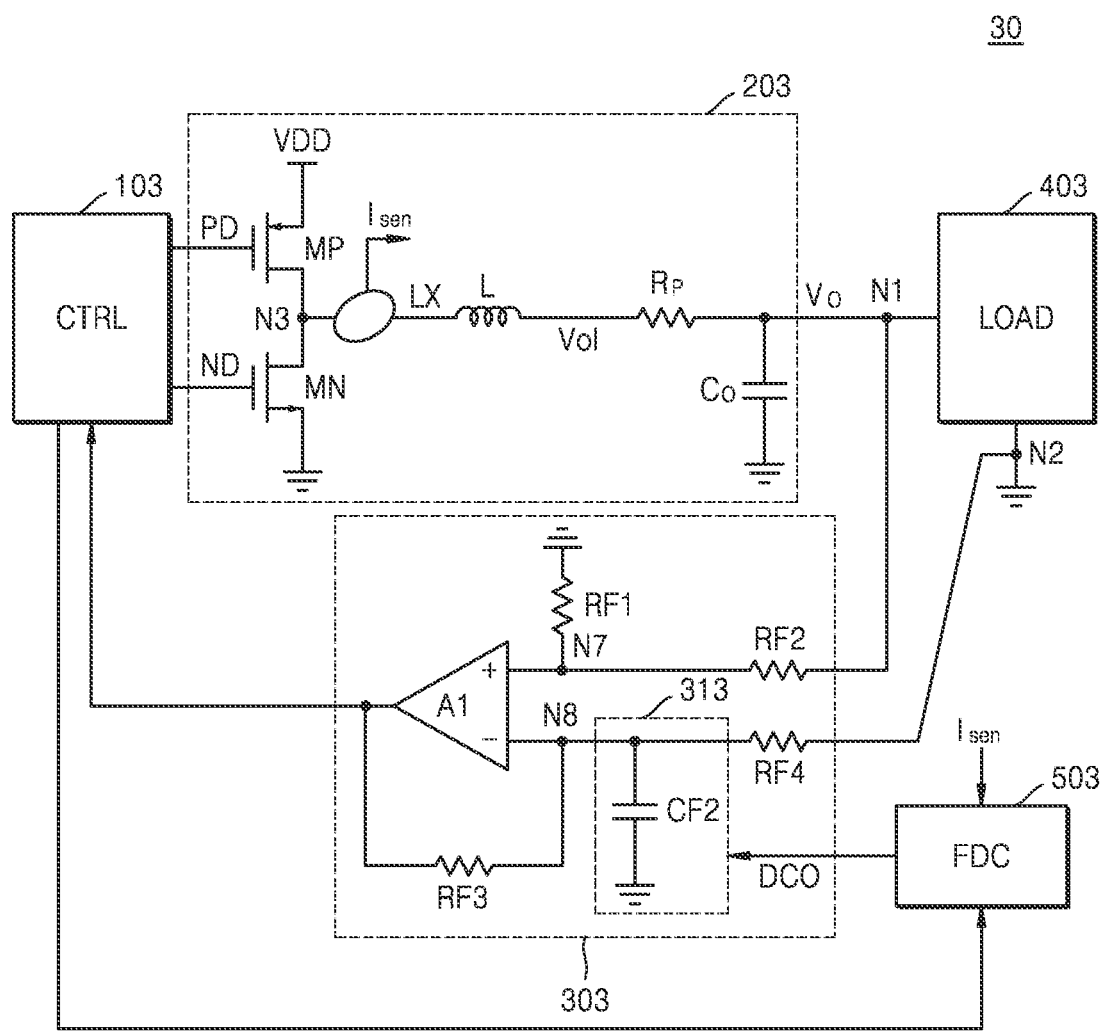

FIG. 9 is a circuit diagram illustrating a PMIC 30 according to embodiments of the inventive concept.

Referring to FIG. 9 (and comparing the embodiments illustrated in FIGS. 2 and 7), the PMIC 30 may include a controller (CTRL) 103, a DC-DC converter 203, a sense circuit 303 including a capacitive array 313, a load 403, and an FDC 503. The DC-DC converter 203 of FIG. 9 may be one of the DC-DC converter 210 of FIG. 3A, the DC-DC converter 220 of FIG. 3B or the DC-DC converter of FIG. 3C. The sense circuit 303 of FIG. 9 may be an example embodiment of the sense circuit 300 of FIG. 4.

The first resistor RF1 may be connected to the seventh node N7 between the positive input terminal of the amplifier A1 and the ground power GND, and the second resistor RF2 may be connected to the seventh node N7 and the first node N1. The third resistor RF3 may be connected to the eighth node N8, which is between the negative input terminal of the amplifier A1 and the output terminal of the amplifier, and the fourth resistor RF4 may be connected between the eighth node N8 and the second node N2.

One end of the capacitive array 313 may be connected to the eighth node N8 between the third resistor RF3 and the fourth resistor RF4 connected to the negative input terminal of the amplifier A1. The other end of the capacitive array 313 may be connected to the ground power GND.

The FDC 503 is a circuit that converts a frequency into a digital code. The FDC 503 may be configured to include a switched capacitor, a current source, a low-pass filter, and an analog-to-digital converter (ADC), but is not limited thereto. The FDC 503 may generate a digital code using an output voltage, which is an analog signal, non-linearly increased as a frequency increases.

In some embodiments, the FDC may adjust the total capacitance of the capacitive array 313 by detecting a magnitude of the detection current Isen, which is a current flowing through the first line LX. In some embodiments, the FDC may adjust zeros and poles of the PMIC 30 by adjusting the capacitance of the capacitive array 312 based on the operating frequency fs of the controller 103.

Figure 10:
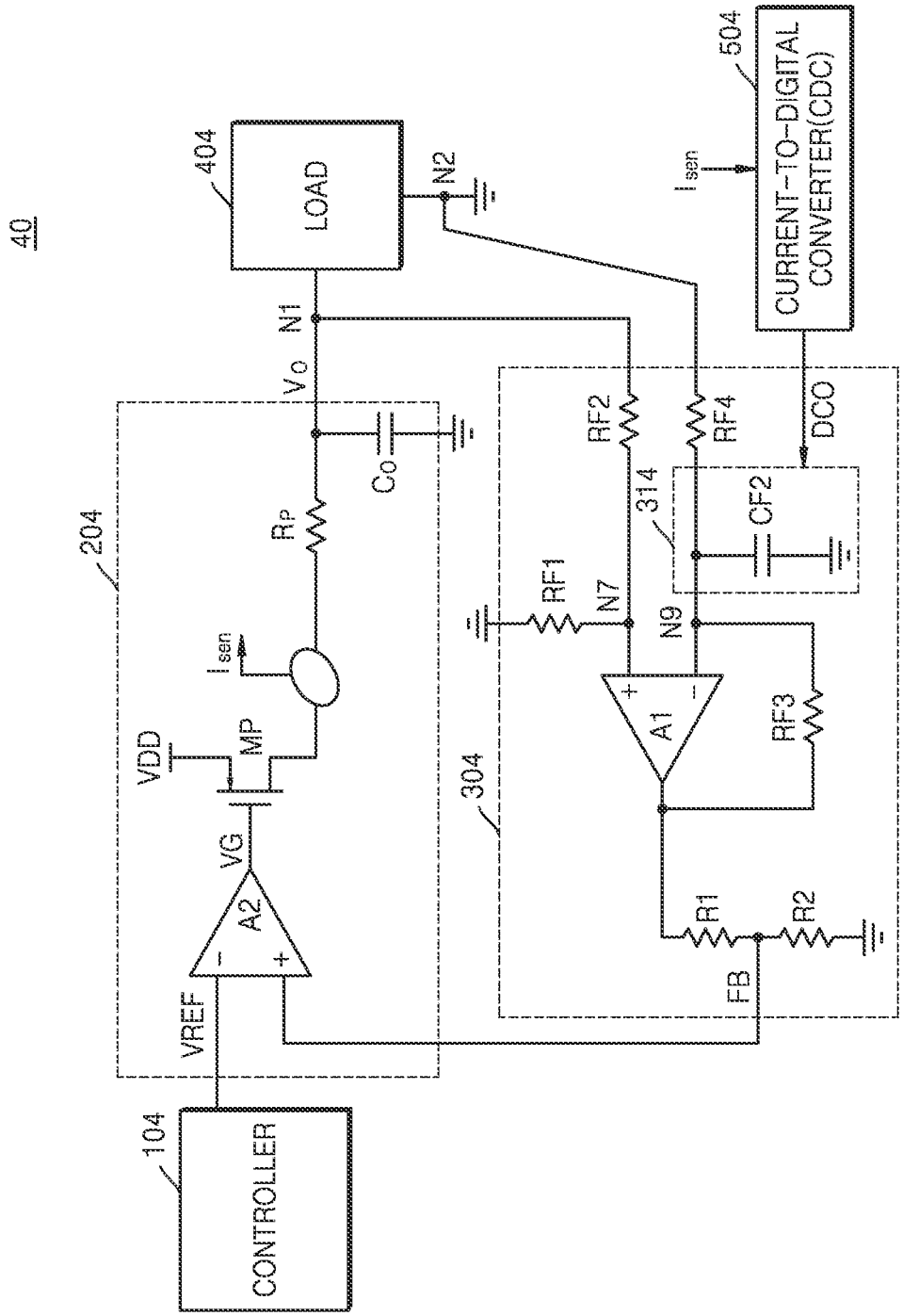

FIG. 10 is a circuit diagram illustrating a PMIC 40 according to embodiments of the inventive concept.

Referring to FIG. 10 (and comparing the embodiments illustrated in FIGS. 2, 7 and 9), the PMIC 40 may include a controller 104, a DC-DC converter 204, a sense circuit 304, a capacitive array 314 included in the sense circuit 304, and a load 404, and a current-to-digital converter (CDC) 504. The DC-DC converter 204 of FIG. 10 may be one of the DC-DC converter 210 of FIG. 3A, the DC-DC converter 220 of FIG. 3B or the DC-DC converter 230 of FIG. 3C, and the sense circuit 304 of FIG. 10 may be the sense circuit 301 of FIG. 4.

The DC-DC converter 204 shown in FIG. 10 may perform the functions previously described in relation to the DC-DC converter 200 of FIG. 2, and may be a linear regulator-type DC-DC converter—as compared with the buck converter-type DC-DC converter 210 of FIG. 3A and the boost converter-type DC-DC converter 220 of FIG. 3B. In this regard, linear regulators are understood to increase or reduce an output voltage relative to an input voltage.

The linear regulator-type DC-DC converter 204 may include an amplifier A2, a P-type MOSFET MP, a converter resistor Rp, and a converter capacitor Co. A reference voltage VREF provided by the controller 104 may be applied to a negative input of the amplifier A2, and a feedback signal FB (e.g., a voltage change signal) output by the sense circuit 304, may be provided to a positive input of the amplifier A2. An output of the amplifier A2 may be provided, as an amplifier output voltage VG, to a gate terminal of the P-type MOSFET MP. A source voltage VDD may be supplied to one end (e.g., a source) of the P-type MOSFET MP, and the other end (e.g., a drain) of the P-type MOSFET MP may be connected to the converter resistor Rp. A current passing through a node of the drain of the P-type MOSFET MP and the converter resistor Rp may be referred to as a detection current Isen, and the detection current Isen may be provided to the CDC 504.

The sense circuit 304 may include an amplifier A1, first to fourth resistors RF1 to RF4, and first and second feedback resistors R1 and R2. Here, the sense circuit 304 additionally includes the first and second feedback resistors R1 and R2 for adjusting an output voltage, as compared to the sense circuit 301 of FIG. 4, but the inventive concept is not limited thereto.

The first resistor RF1 and the second resistor RF2 may be connected to a positive input terminal of the amplifier A1, the first resistor RF1 may be connected to the ground power GND, and the second resistor RF2 may be connected to a node that provides an output voltage Vo to the load 404. The third resistor RF3 and the fourth resistor RF4 may be connected to a negative input terminal of the amplifier A1, the third resistor RF3 may be connected to an output terminal of the amplifier A1, and the fourth resistor RF4 may be connected to a node that provides the ground power GND to the load 404. One end of the first feedback resistor R1 may be connected to the output terminal of the amplifier A1, and the other end thereof may be connected to the second feedback resistor R2. The other end of the second feedback resistor R2 may be connected to the ground power GND. A feedback signal FB may be generated from a node of the first feedback resistor R1 and the second feedback resistor R2, and the feedback signal FB may be provided to the DC-DC converter 204.

In some embodiments, one end of the capacitive array 314 may be connected to a ninth node N9 between the third resistor RF3 and the fourth resistor RF4 connected to the negative input terminal of the amplifier A1, and the other end of the capacitive array 314 may be connected to the ground power GND.

A CDC is a circuit that converts current into a digital code. The CDC 504 may be configured to include a low-pass filter and an analog-to-digital converter (ADC), but is not limited thereto. The detection current Isen passes through the low-pass filter to generate a detection voltage linearly proportional to the detection current Isen. As the detection voltage increases, the CDC 504 may analog-to-digital convert an output voltage, which is an analog signal, to generate a digital code.

The CDC may adjust the total capacitance of the capacitive array 314 by detecting a magnitude of the detection current Isen, which is a current flowing through the inductor L. According to the technical idea of the inventive concept, the CDC may adjust a zero and a pole of the PMIC 40 by adjusting the capacitance of the capacitive array 314 based on the detection current Isen.

Figure 11A:
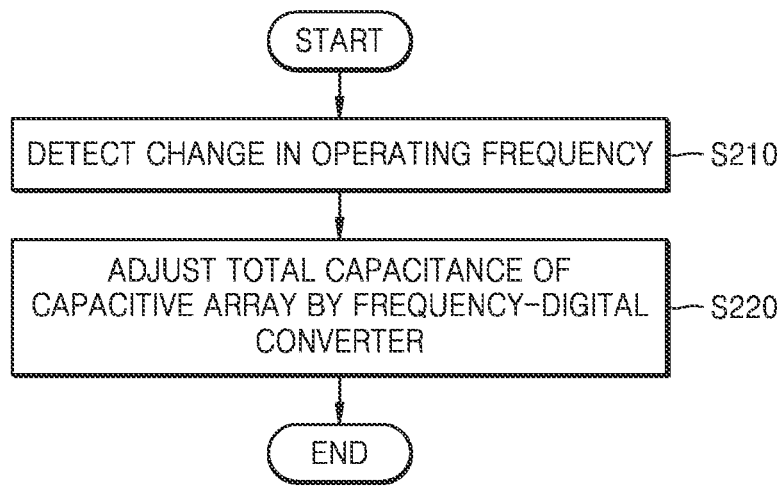
FIGS. 11A and 11B are flowcharts illustrating a method of operating a PMIC according to embodiments of the inventive concept.
Figure 11B:
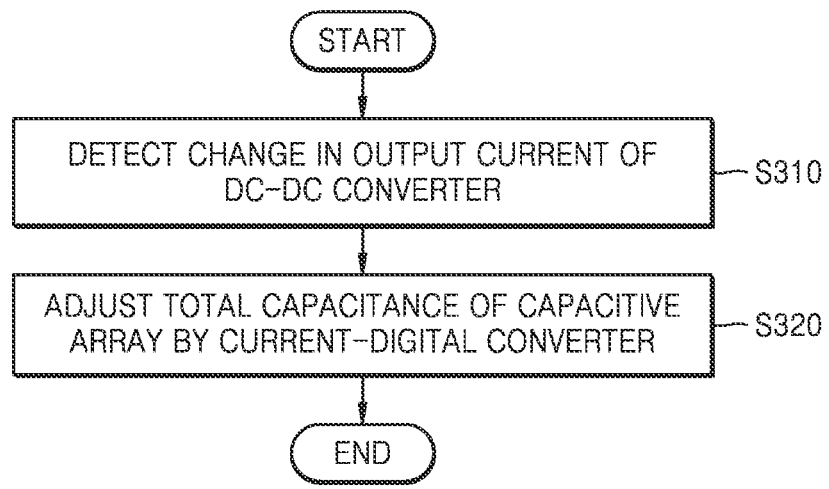

FIGS. 11A and 11B are flowcharts illustrating methods of operating the PMIC 20 according to embodiments of the inventive concept. The PMIC executing the method of FIGS. 11A and 11B may be the PMIC 30 of FIG. 9 or the PMIC 40 of FIG. 10.

Referring to FIGS. 8, 10 and 11A, a change in the operating frequency fs of the PMIC 30 is detected (S210). Here, the change in the operating frequency fs may be detected as the controller 103 provides the operating frequency fs for driving the PMIC 30 to the FDC 503.

Then, the FDC 503 adjusts the total capacitance of the capacitive array 312 (S220). Here, the FDC 503 may generate a DCO capable of adjusting the total capacitance by adjusting switching of the capacitive array 312. For example, as the operating frequency fs increases, the FDC may provide the DCO as a digital signal that adjusts a combination of a plurality of capacitors to decrease the total capacitance of the capacitive array 312, and as the operating frequency fs decreases, the FDC may generate the DCO as a digital signal that adjusts a combination of the plurality of capacitors to increase the total capacitance of the capacitive array 312.

Referring to FIGS. 8, 10 and 11B, a change in the output current of the DC-DC converter 203 is detected (S310). Here, a change in the detection current Isen flowing through the inductor L included in the DC-DC converter 203 and connected to the third node N3 may be detected.

Then, the current-to-digital converter 504 adjusts the total capacitance of the capacitive array 314 (S320). Here, the CDC 504 may generate a DCO capable of adjusting the total capacitance by adjusting switching of the capacitive array 314 based on the detection current Isen. For example, as the detection current Isen increases, the CDC may provide, to the capacitive array 314, the DCO as a digital signal that adjusts a combination of a plurality of capacitors to decrease the total capacitance of the capacitive array 314. The CDC may adjust the zero and the pole of the PMIC 30 by adjusting the capacitance of the capacitive array 314 based on the detection current Isen.

Figure 12:
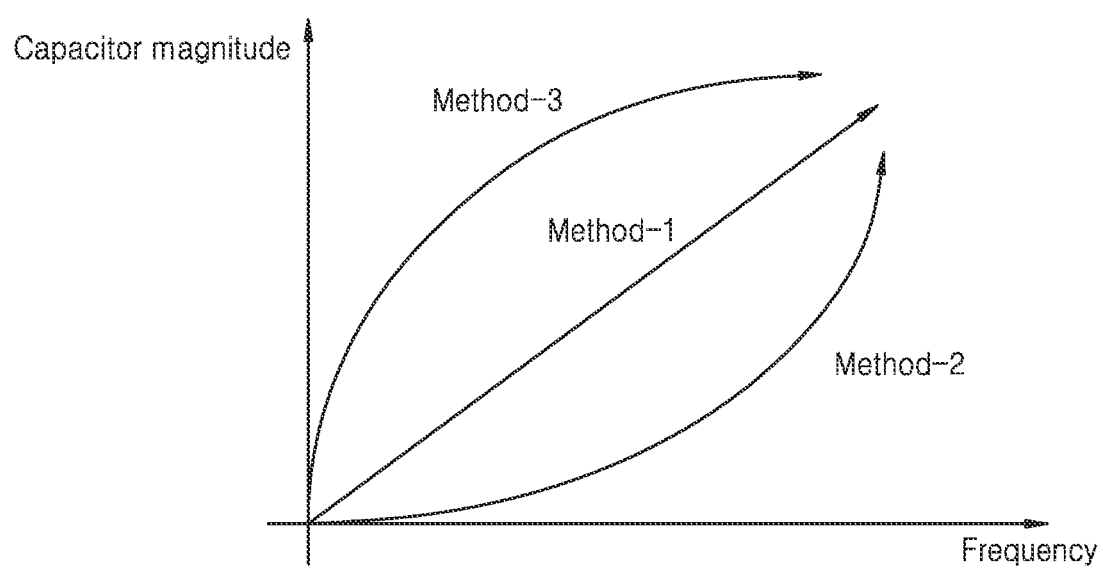
FIG. 12 is a graph illustrating a magnitude of a capacitive element as a function of frequency for a number of adjustment modes according to embodiments of the inventive concept.

FIG. 12 is a graph illustrating magnitude of the capacitive element 310 over frequency for each adjustment mode in relation to the embodiment illustrated in FIG. 2.

The capacitive element (310 of FIG. 2) may select an adjustment mode for adjusting capacitance according to a change in the operating frequency fs. In some embodiments, the capacitive element 310 may select any one of a first adjustment mode for responding linearly to a change in the operating frequency fs, a second adjustment mode for responding exponentially to a change in the operating frequency fs, and a third adjustment mode for responding logarithmically to a change in the operating frequency fs. The capacitive element 310 may secure a fast response rate by selecting an adjustment mode.

While the inventive concept has been particularly shown and described with reference to certain embodiments thereof, it will be understood that various changes in form and function may be made therein without departing from the spirit and scope of the following claims.

What is claimed is:

1. A power management integrated circuit (PMIC), comprising:
    a DC-DC converter configured to provide output power to a load;
    a controller configured to control switching of the DC-DC converter; and
    a sense circuit including a capacitive element and configured to detect an output current flowing through a node between the DC-DC converter and the load,
    wherein the sense circuit further includes an operational amplifier and at least one resistor,
    the capacitive element is connected between a negative input terminal of the operational amplifier and ground, and
    the PMIC adjusts capacitance of the capacitive element in response to operating frequency driving the PMIC and forms an additional pole and zero in relation to the capacitive element of the sense circuit.

2. The PMIC of claim 1, wherein the at least one resistor comprises a first resistor connected to ground, and a second resistor connected to the node, and the first and second resistors are connected to a positive input terminal of the operational amplifier, and
    the at least one resistor further comprises a third resistor connected to an output terminal of the operational amplifier, and a fourth resistor connected to ground, and the third and fourth resistors are connected to the negative input terminal.

3. The PMIC of claim 2, wherein a ratio of resistance values for the first resistor and the second resistor is the same as a ratio of resistance values for the third resistor and the fourth resistor.

4. The PMIC of claim 1, wherein the DC-DC converter includes a buck converter.

5. The PMIC of claim 1, wherein the DC-DC converter includes a boost converter.

6. The PMIC of claim 1, wherein the DC-DC converter includes a buck-boost converter.

7. The PMIC of claim 1, wherein the DC-DC converter includes a linear regulator.

8. The PMIC of claim 1, wherein the DC-DC converter has an operating bandwidth and phase margin determined at least in part by the capacitive element of the sense circuit.

9. A power management integrated circuit (PMIC), comprising:
- a DC-DC converter configured to provide output power to a load;
- a controller configured to control switching of the DC-DC converter;
- a sense circuit including a capacitive array and configured to detect an output current flowing through a node between the DC-DC converter and the load; and
- a frequency-digital converter configured to adjust a total capacitance of the capacitive array.

10. The PMIC of claim 9, wherein the frequency-digital converter adjusts the total capacitance by switching the capacitive array in response to an operating frequency received from the controller.

11. The PMIC of claim 9, wherein the DC-DC converter includes an inductor, and
the frequency-digital converter converts an inductor current flowing through the inductor into a digital code.

12. The PMIC of claim 9, wherein the sense circuit further includes an operational amplifier and at least one resistor, and
the capacitive array is connected between a negative input terminal of the operational amplifier and ground.

13. The PMIC of claim 12, wherein the at least one resistor comprises a first resistor connected to ground, and a second resistor connected to the node, and the first and second resistors are connected to a positive input terminal of the operational amplifier, and
the at least one resistor further comprises a third resistor connected to an output terminal of the operational amplifier, and a fourth resistor connected to ground, and the third and fourth resistors are connected to the negative input terminal of the operational amplifier.

14. The PMIC of claim 13, wherein a ratio of resistance values for the first resistor and the second resistor is the same as a ratio of resistance values for the third resistor and the fourth resistor.

15. The PMIC of claim 9, wherein the PMIC forms an additional pole and zero in relation to the capacitive array of the sense circuit.

16. An operating method for a power management integrated circuit (PMIC), the method comprising:
- detecting a change in an output current at a node between the PMIC and a load;
- supplying an output voltage corresponding to the output current to the node in accordance with a zero and a pole added in relation to a capacitive element included in a sense circuit; and
- adjusting capacitance of the capacitive element in response to an operating frequency driving the PMIC,
wherein the adjusting of capacitance of the capacitive element comprises
measuring an inductor current flowing through an inductor in the PMIC, and
adjusting the capacitance in response to a frequency of the inductor current.

* * * * *